(12) United States Patent
Chueh et al.

(10) Patent No.: US 7,561,420 B2
(45) Date of Patent: Jul. 14, 2009

(54) FOLDABLE ELECTRONIC APPARATUS

(75) Inventors: Shu-Fang Chueh, Taipei (TW); Wen-Hung Wang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 217 days.

(21) Appl. No.: 11/772,835

(22) Filed: Jul. 3, 2007

(65) Prior Publication Data

US 2008/0055837 A1 Mar. 6, 2008

(30) Foreign Application Priority Data

Aug. 30, 2006 (TW) .............................. 95131987 A

(51) Int. Cl.
G06F 1/16 (2006.01)
(52) U.S. Cl. .............................. 361/679.59; 361/679.55
(58) Field of Classification Search ................................ 361/679.55–679.59, 679.21, 679.27
See application file for complete search history.

(56) References Cited

U.S. PATENT DOCUMENTS

| 5,175,672 | A |   | 12/1992 | Conner et al. |   |
|---|---|---|---|---|---|
| 5,199,888 | A | * | 4/1993 | Condra et al. | 361/679.55 |
| 5,918,957 | A | * | 7/1999 | Bovio et al. | 361/679.58 |
| 6,002,581 | A | * | 12/1999 | Lindsey | 361/679.55 |
| 6,053,589 | A | * | 4/2000 | Lin | 361/679.59 |
| 6,097,592 | A | * | 8/2000 | Seo et al. | 361/679.55 |
| 6,198,624 | B1 |   | 3/2001 | Margaritis |   |
| 6,353,529 | B1 |   | 3/2002 | Cies |   |
| 6,452,795 | B1 |   | 9/2002 | Lee |   |
| 6,757,160 | B2 | * | 6/2004 | Moore et al. | 361/679.55 |
| 6,975,507 | B2 |   | 12/2005 | Wang et al. |   |
| 7,068,496 | B2 |   | 6/2006 | Wong et al. |   |
| 7,075,781 | B2 | * | 7/2006 | Peng | 361/679.55 |
| 2005/0057894 | A1 | * | 3/2005 | Kim et al. | 361/683 |
| 2008/0304217 | A1 | * | 12/2008 | Lai et al. | 361/681 |

FOREIGN PATENT DOCUMENTS

| CN | 2513324 | 9/2002 |
|---|---|---|
| TW | 577559 | 2/2004 |

* cited by examiner

Primary Examiner—Lisa Lea-Edmonds
(74) Attorney, Agent, or Firm—Jianq Chyun IP Office

(57) ABSTRACT

A foldable electronic apparatus including a first body, a second body, a transmitting module and a supporting portion is provided. The first body has a transmitting structure and is pivoted to the second body along a first rotational axis. The transmitting module is disposed in the second body and corresponds to the transmitting structure. In addition, one side of the supporting portion is pivoted to the second body along a second rotational axis, and the other side of the supporting portion is connected to the transmitting module.

15 Claims, 9 Drawing Sheets

FOLDABLE ELECTRONIC APPARATUS

CROSS-REFERENCE TO RELATED APPLICATION

This application claims the priority benefit of Taiwan application serial no. 95131987, filed Aug. 30, 2006. All disclosure of the Taiwan application is incorporated herein by reference.

BACKGROUND OF THE INVENTION

1. Field of Invention

The present invention relates to an electronic apparatus. More particularly, the present invention relates to a foldable electronic apparatus.

2. Description of Related Art

In the information age, people more and more rely on electronic apparatus. In order to meet the demands for light and thin electronic products with high speed, high performance, electronic apparatus, for example, notebook computers have become the mainstream and are an indispensable tool in modern life.

FIG. 1 is a schematic view of a conventional notebook computer. Referring to FIG. 1, the notebook computer 100 is usually foldable to reduce the accommodating area, so as to achieve the purpose of being light and thin. In general, the notebook computer 100 includes a display 110 and a mainframe body 120 connected to the display 110 via at least one hinge 130.

It should be noted that when a user unfolds the notebook computer 100 and rotates the display 110 pivoted to the mainframe body 120 to a position suitable for viewing, if the moment generated by the display 110 to the mainframe body 120 is too large, the notebook computer 100 is easily overturned, which may cause a collision between the electronic components in the display 110 or the mainframe body 120 and thus influence the normal operation.

A method of increasing the weight of the system to prevent the notebook computer 100 from being overturned when rotating the display 110 has been disclosed. In specific, according to the conventional art, the weight of the mainframe body 120 is increased to compensate the moment generated by the display 110 to the mainframe body 120, such that the notebook computer 100 can be stably placed on a working platform. However, as the trend is towards lighter and thinner notebook computers in the market, the conventional notebook computer 100 cannot satisfy the market demands.

SUMMARY OF THE INVENTION

The present invention is directed to provide a foldable electronic apparatus to solve the problem of the overturn of the foldable electronic apparatus due to the unbalanced weight of the two pivoted bodies.

In order to achieve the above or other objectives, the present invention provides a foldable electronic apparatus, which comprises a first body, a second body, at least one transmitting module and at least one supporting portion. The first body has at least one transmitting structure, and the second body is pivoted to the first body along a first rotational axis, such that the transmitting structure on the first body can rotate along the first rotational axis. The transmitting module is disposed in the second body and corresponds to the transmitting structure. In addition, one side of the supporting portion is pivoted to the second body along a second rotational axis, and the other side of the supporting portion is connected to the transmitting module.

In an embodiment of the present invention, the transmitting structure is disposed on a surface of the first body adjacent to the second body.

In an embodiment of the present invention, the second body comprises at least one opening corresponding to the transmitting structure, wherein the opening is disposed on a surface of the second body adjacent to the first body and exposes the transmitting module.

In an embodiment of the present invention, the supporting portion is pivoted to the second body by a torsion spring.

In an embodiment of the present invention, the transmitting module has a first engaging structure, and the supporting portion has a second engaging structure, wherein the first engaging structure and the second engaging structure are engaged with each other.

In an embodiment of the present invention, the relative movement between the transmitting structure and the transmitting module drives the second engaging structure to be disengaged from the first engaging structure, and the supporting portion rotates along the second rotational axis in a direction away from the second body to a predetermined position.

In an embodiment of the present invention, the first engaging structure is a tenon, and the second engaging structure is a hook.

In an embodiment of the present invention, the second body comprises a plurality of connection ports covered by the supporting portion.

The present invention further provides a foldable electronic apparatus, which comprises a first body, a second body, at least one first transmitting portion, at least one second transmitting portion, at least one bias component and at least one supporting portion. The first body has at least one protrusion, and the second body is pivoted to the first body along a first rotational axis, such that the protrusion on the first body can rotate along the first rotational axis. The first transmitting portion is disposed in the second body corresponding to the protrusion, wherein the protrusion rotating along the first rotational axis is suitable to drive the first transmitting portion to move along a first axis. The second transmitting portion is disposed in the second body corresponding to the first transmitting portion and has a first engaging structure. Moreover, the bias component is disposed between the second transmitting portion and the second body along a second axis, and applies a bias force to the second transmitting portion relative to the second body. When moving along the first axis, the first transmitting portion drives the second transmitting portion to move along the second axis to and fro. In addition, the supporting portion is pivoted to the second body along a second rotational axis, wherein the supporting portion has a second engaging structure for engaging the first engaging structure.

In an embodiment of the present invention, the first axis is perpendicular to the second axis.

In an embodiment of the present invention, the first axis is perpendicular to the first rotational axis.

In an embodiment of the present invention, the second axis is perpendicular to the second rotational axis.

In an embodiment of the present invention, the first rotational axis is perpendicular to the second rotational axis.

In an embodiment of the present invention, the protrusion is disposed on a surface of the first body adjacent to the second body.

In an embodiment of the present invention, the second body comprises at least one opening corresponding to the protrusion, wherein the opening is disposed on a surface of the second body adjacent to the first body and exposes the first transmitting portion.

In an embodiment of the present invention, the supporting portion is pivoted to the second body by a torsion spring.

In an embodiment of the present invention, the relative movement between the first transmitting portion and the second transmitting portion can drive the second engaging structure to be disengaged from the first engaging structure, and the supporting portion rotates along the second rotational axis in a direction away from the second body to a predetermined position.

In an embodiment of the present invention, the bias component is a spring.

In an embodiment of the present invention, the first body is a display.

In an embodiment of the present invention, the second body is a host.

In an embodiment of the present invention, the first body is pivoted to the second body by a pivoting mechanism.

In an embodiment of the present invention, the first engaging structure is a tenon, and the second engaging structure is a hook.

In an embodiment of the present invention, the second body comprises a plurality of connection ports covered by the supporting portion.

In the present invention, at least one supporting portion is pivoted to the second body along the second rotational axis. After the user unfolds the foldable electronic apparatus of the present invention, the supporting portion automatically rotates along the second rotational axis in a direction away from the second body to a predetermined position (the supporting portion can also be adjusted to the predetermined position manually), so as to compensate the moment generated by the first body to the second body, such that the foldable electronic apparatus can be stably placed on a working platform.

In order to make the aforementioned and other objectives, features and advantages of the present invention comprehensible, preferred embodiments accompanied with figures are described in detail below.

DESCRIPTION OF EMBODIMENTS

Figure 1:
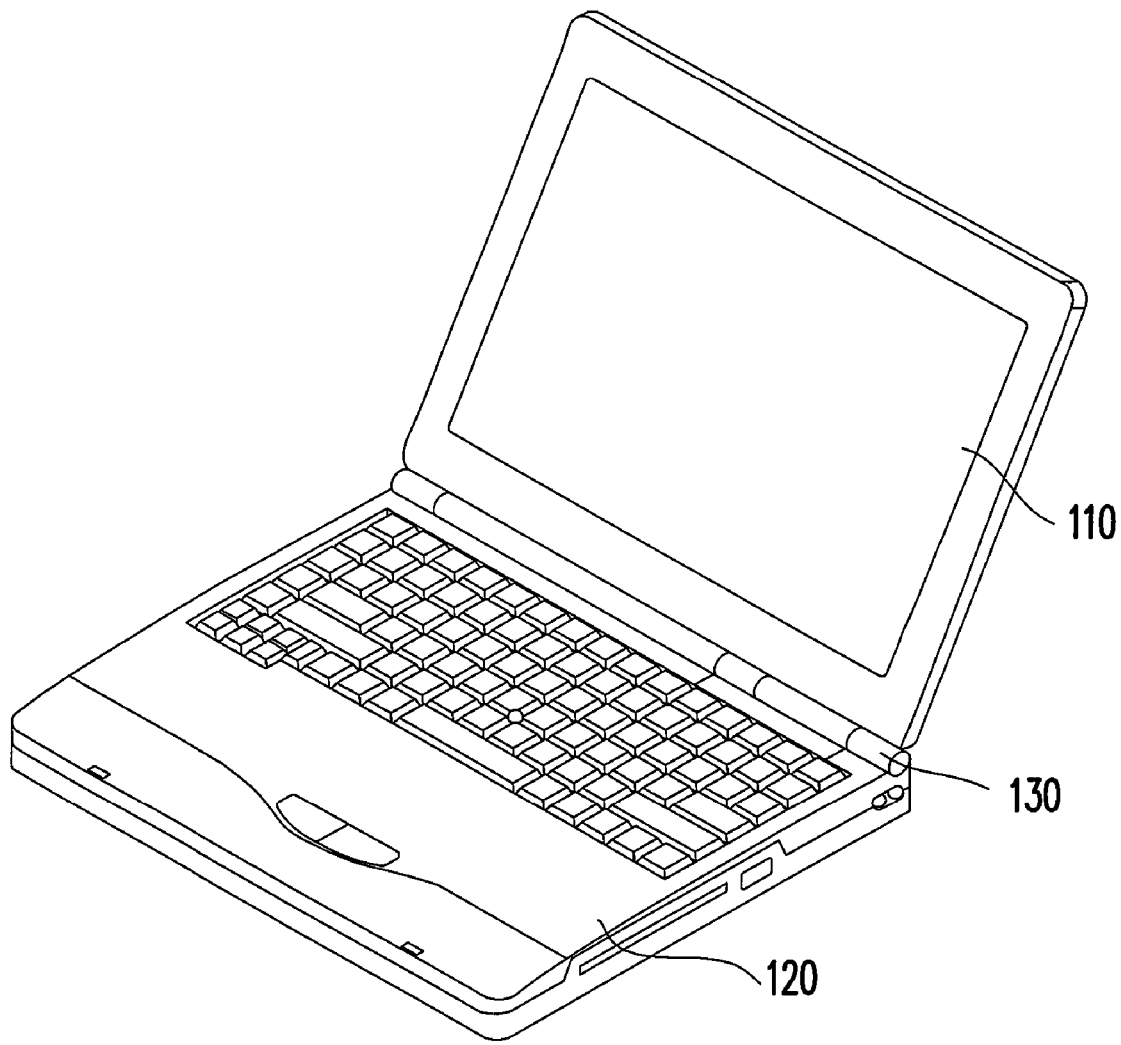
FIG. 1 is a schematic view of a conventional notebook computer.
Figure 2A:
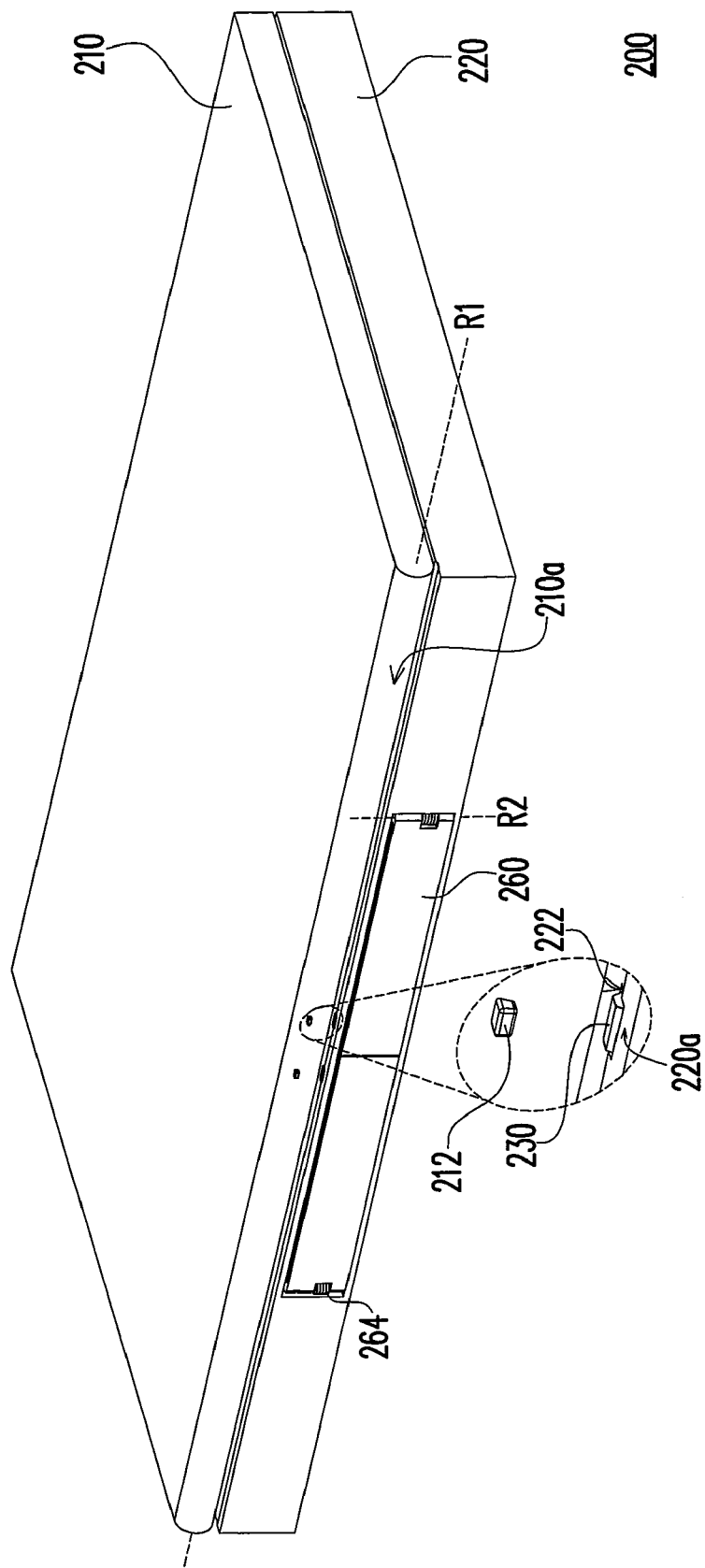
FIG. 2A is a schematic view of a foldable electronic apparatus before being unfolded according to the preferred embodiment of the present invention.

FIG. 2A is a schematic view of a foldable electronic apparatus before being unfolded according to a preferred embodiment of the present invention. Referring to FIG. 2A, the foldable electronic apparatus 200 of this embodiment mainly includes a first body 210 and a second body 220, wherein the first body 210 is a display and the second body 220 is a mainframe body. In this embodiment, the second body 220 is pivoted to the first body 210 along a first rotational axis R1. For example, the second body 220 is, for example, pivoted to the first body 210 by a pivoting mechanism. Moreover, the first body 210 of this embodiment has at least one transmitting structure, for example, a protrusion 212, and in this embodiment, two protrusions 212 are shown in FIG. 2A. The mentioned protrusions 212 are disposed on a surface 210a of the first body 210 adjacent to the second body 220. As such, when the user unfolds the foldable electronic apparatus 200, and rotates the first body 210 along the first rotational axis R1, the protrusions 212 on the first body 210 can also rotate along the first rotational axis R1.

Referring to FIG. 2A again, in this embodiment, at least one supporting portion 260 is pivoted to the second body 220 along the second rotational axis R2 (one side of the supporting portion 260 is pivoted to the second body 220 along a second rotational axis R2, and the other side of the supporting portion 260 is movably connected to a transmitting module in the second body 220). For example, FIG. 2A shows two supporting portions 260, wherein the second rotational axis R2 is perpendicular to the first rotational axis R1. In this embodiment, when the user unfolds the foldable electronic apparatus 200 and rotates the first body 210 to a position suitable for viewing, the supporting portion 260 can automatically or manually rotate along the second rotational axis R2 to a predetermined position. Thus, in this embodiment, the moment generated by the first body 210 to the second body 220 is compensated by the supporting portion 260, so as to solve the problem that the foldable electronic apparatus 200 is easily overturned after being unfolded.

The connection relations between the main components in the foldable electronic apparatus 200 and how the supporting portion 260 rotates to a predetermined position to prevent the foldable electronic apparatus 200 from being overturned after being unfolded are described in detail below.

Figure 2B:
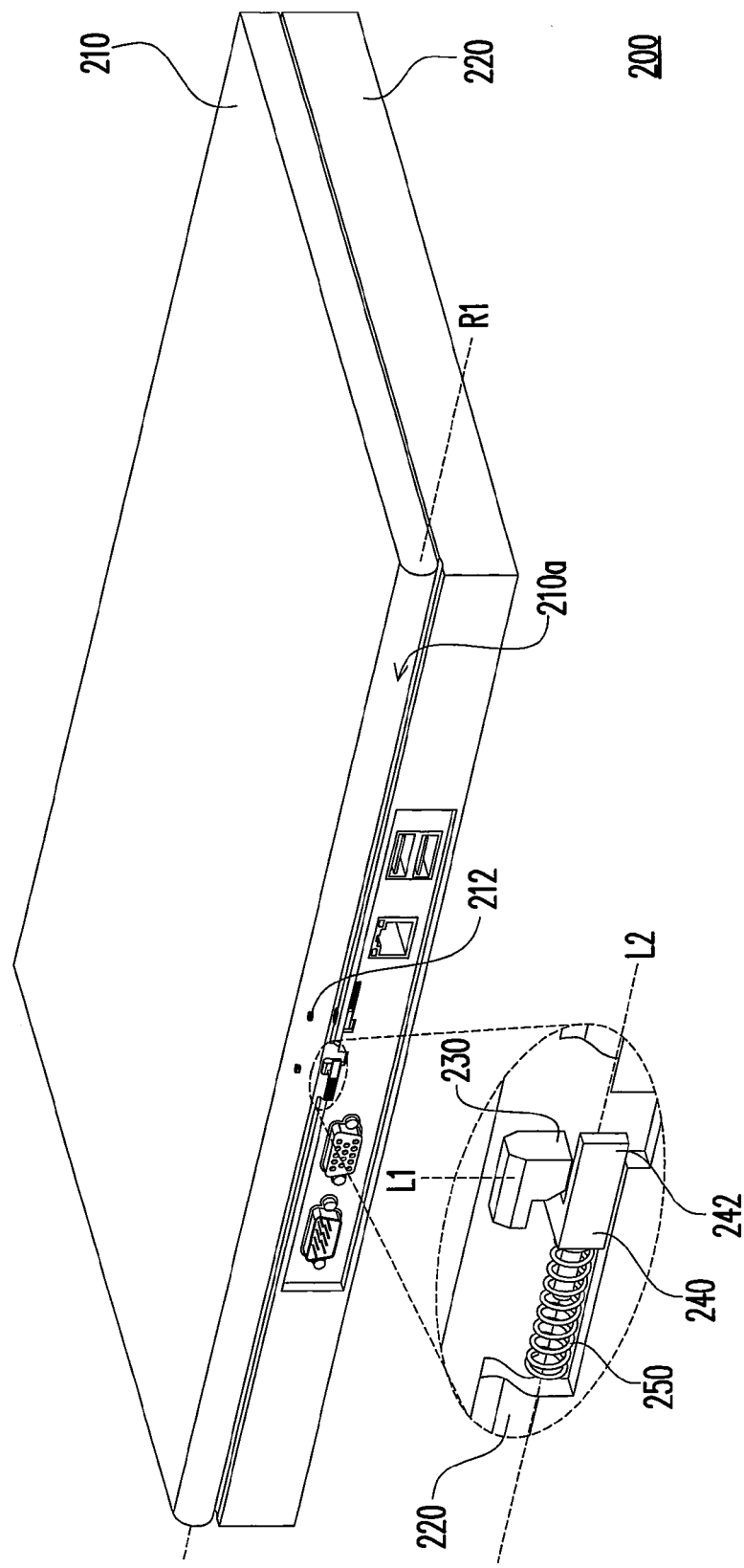
FIG. 2B is a schematic view of the foldable electronic apparatus of FIG. 2A with the supporting portion and a part of the second body removed.
Figure 2C:
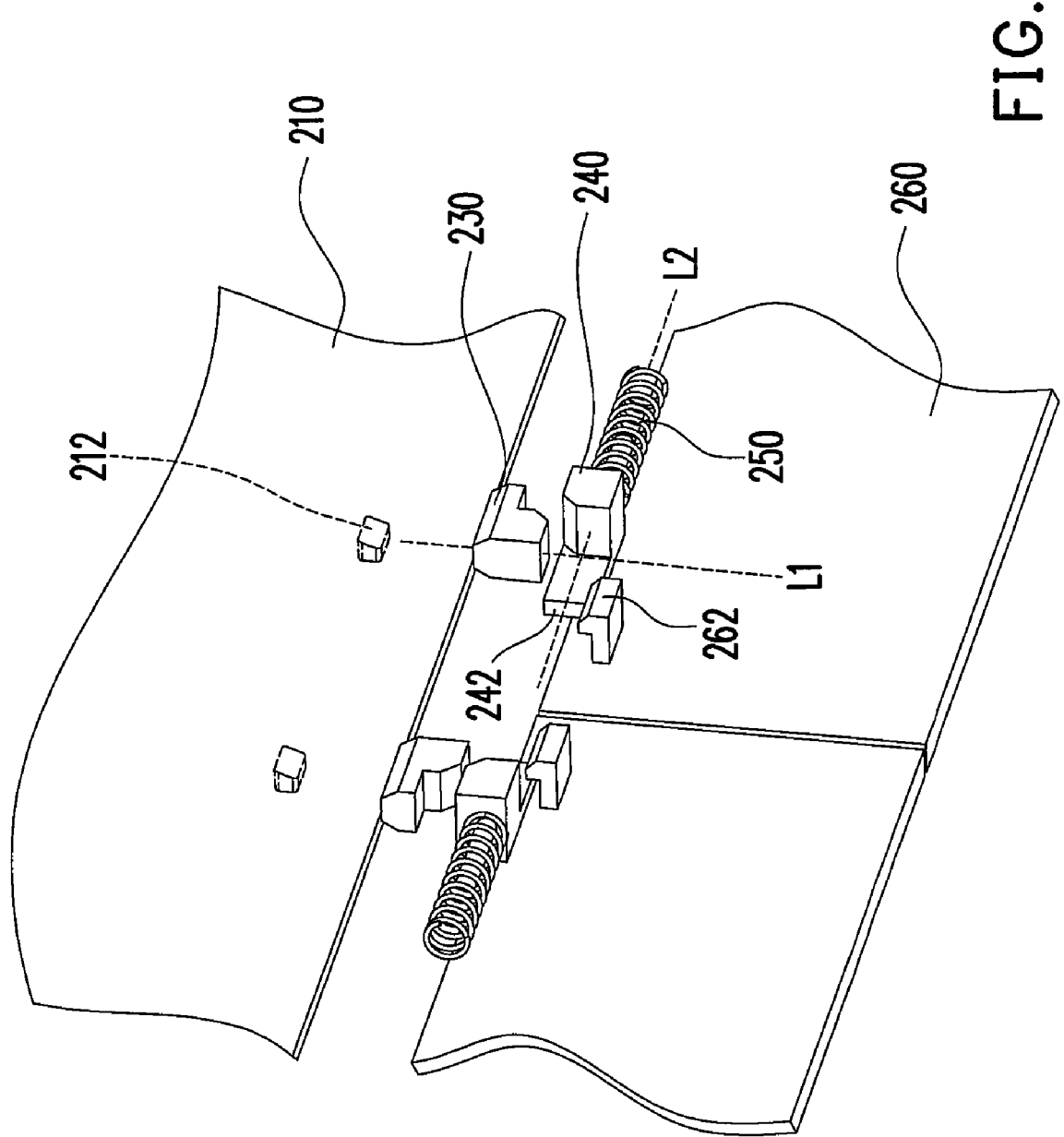
FIG. 2C is a stereogram of the transmitting structure (protrusion), the transmitting module (the first transmitting portion, the second transmitting portion, and the bias component) and the supporting portion of FIG. 2B from another viewing angle.

This embodiment is further illustrated with reference to FIGS. 2A, 2B and 2C. FIG. 2B is a schematic view of the foldable electronic apparatus of FIG. 2A with the supporting portion and a part of the second body removed. FIG. 2C is a stereogram of the transmitting structure (protrusion), the transmitting module (the first transmitting portion, the second transmitting portion, and the bias component) and the supporting portion in FIG. 2B from another viewing angle. In FIGS. 2B and 2C, the foldable electronic apparatus 200 of this embodiment further includes at least one transmitting module in addition to the first body 210, the second body 220 and the supporting portion 260, wherein the transmitting module of this embodiment is disposed in the second body 220. The transmitting module is, for example, constituted by a first transmitting portion 230, a second transmitting portion 240 and a bias component 250 (two first transmitting portions 230, two second transmitting portions 240 and two bias components 250 are shown in FIG. 2C, wherein each first transmitting portion 230, second transmitting portion 240 and bias component 250 correspond to the supporting portion 260 respectively).

In this embodiment, the first transmitting portion 230 is disposed in the second body 220 corresponding to the protrusions 212. Two openings 222 corresponding to the protrusions 212 are respectively disposed on a surface 220a of the second body 220 adjacent to the first body 210 (as shown in FIG. 2A), and expose the first transmitting portion 230. When the protrusions 212 rotate along the first rotational axis R1, for example, the first body 210 rotates along the first rotational axis R1, and an angle of 90° is formed between the first body 210 and the second body 220, the protrusions 212 may press the first transmitting portion 230 downward to make the first transmitting portion 230 move along the first axis L1, wherein the first axis L1 is perpendicular to the first rotational axis R1.

The second transmitting portion 240 is disposed in the second body 220 corresponding to the first transmitting portion 230 and has a first engaging structure 242. It should be noted that the supporting portion 260 of this embodiment is assembled with a second engaging structure 262 for engaging the first engaging structure 242, so that the supporting portion 260 can be engaged with the second transmitting portion 240. For example, the first engaging structure 242 is a tenon, and the second engaging structure 262 is a hook. Definitely, the connection manner between the supporting portion 260 and the second transmitting portion 240 is not limited in the present invention. In other words, the supporting portion 260 can also be retained to the second transmitting portion 240 in another appropriate connection manner (for example, the manufacturer can dispose a magnet on the supporting portion 260 and the second transmitting portion 240 respectively, such that the supporting portion 260 can be retained onto the second transmitting portion 240 by the attraction force between the two magnets). In another aspect, the bias component 250 is disposed between the second transmitting portion 240 and the second body 220 along the second axis L2 to provide a bias force to the second transmitting portion 240 relative to the second body 220, wherein the second axis L2 is perpendicular to the first axis L1 and the second rotational axis R2 respectively. Moreover, in this embodiment, the bias component 250 is a spring.

Figure 3A:
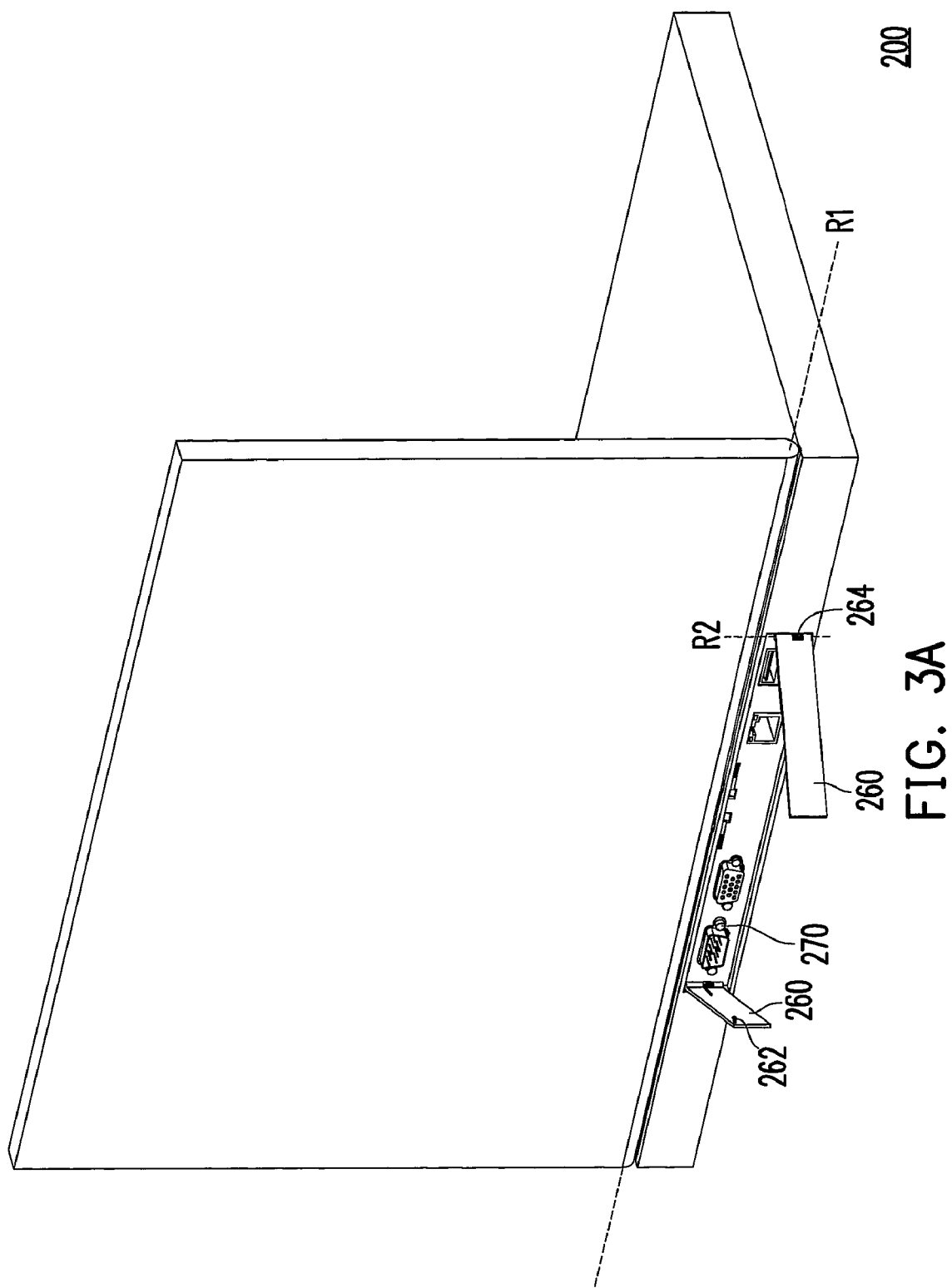
FIG. 3A is a schematic view of the foldable electronic apparatus of FIG. 2A after being unfolded.
Figure 3B:
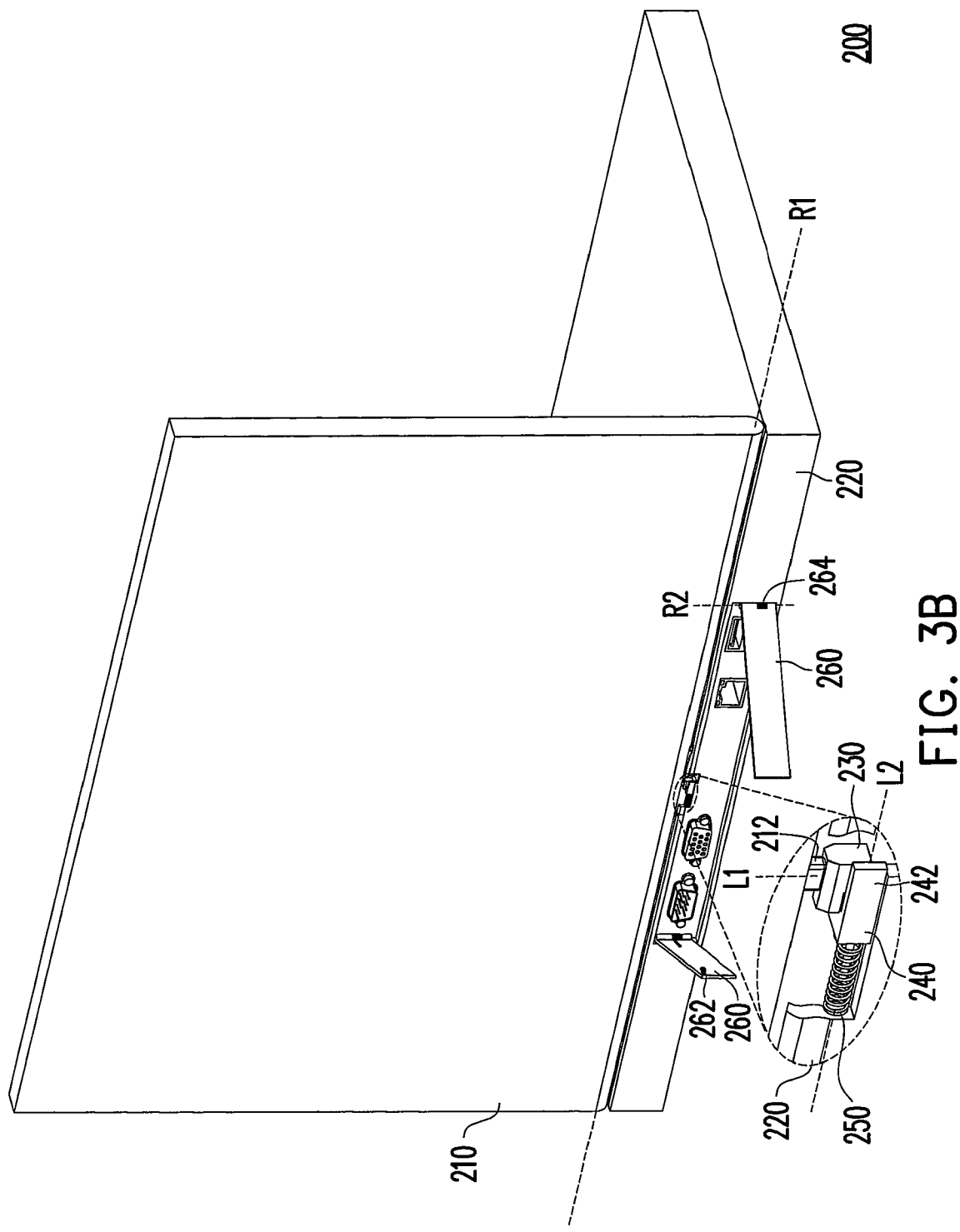
FIG. 3B is a schematic view of the foldable electronic apparatus of FIG. 3A with a part of the second body removed.
Figure 3C:
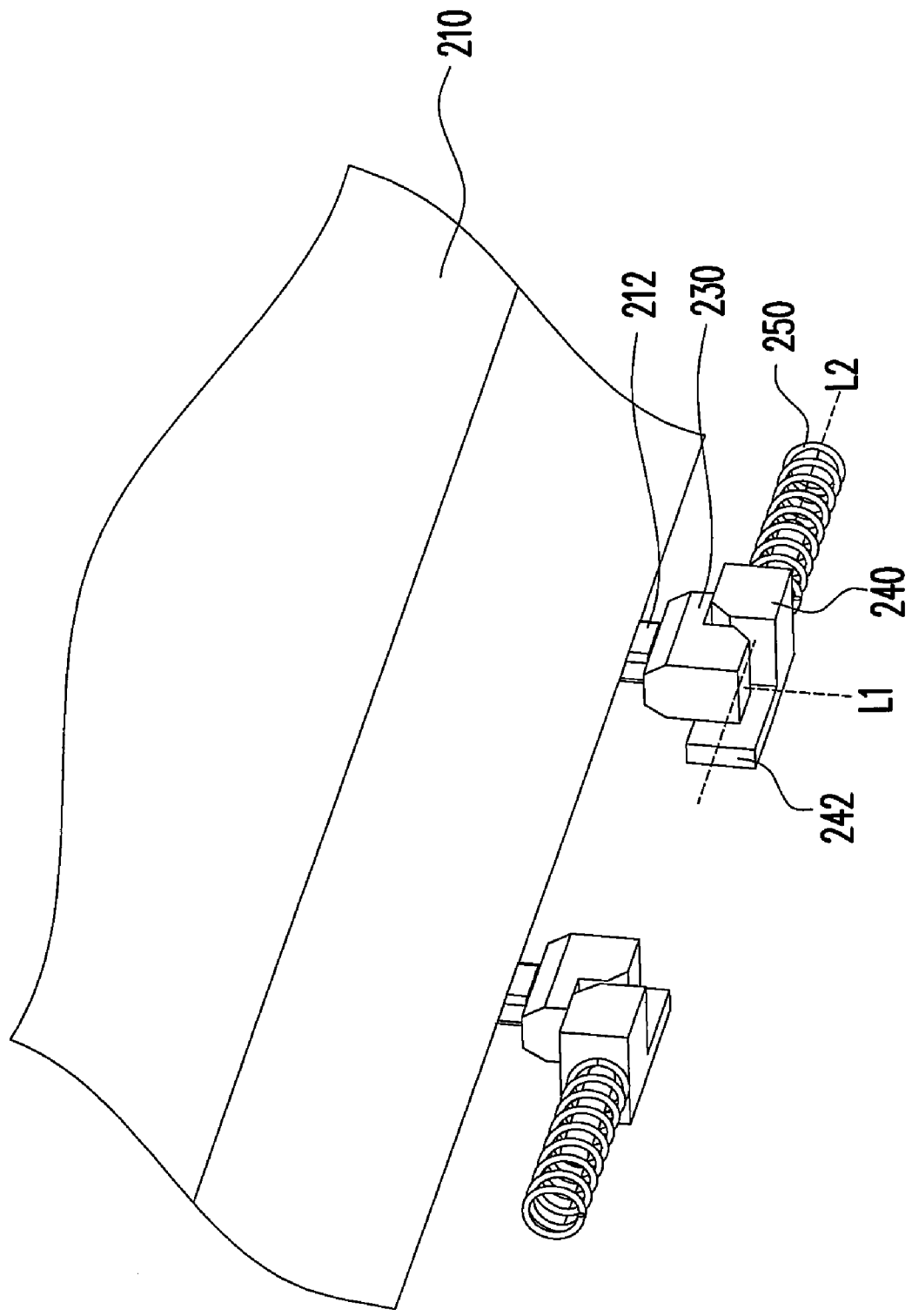
FIG. 3C is a stereogram of the protrusion, the first transmitting portion, the second transmitting portion and the bias component of FIG. 3B from another viewing angle.

Then, referring to FIGS. 3A, 3B and 3C, FIG. 3A is a schematic view of the foldable electronic apparatus of FIG. 2A after being unfolded. FIG. 3B is schematic view of the foldable electronic apparatus of FIG. 3A with a part of the second body removed. FIG. 3C is a stereogram of the protrusion, the first transmitting portion, the second transmitting portion and the bias component of FIG. 3B from another viewing angle.

Referring to FIGS. 3A, 3B and 3C together, when the foldable electronic apparatus 200 is unfolded (the first body 210 rotates relative to the second body 220 to a position suitable for viewing), the second engaging structure 262 of the supporting portion 260 is disengaged from the first engaging structure 242 of the second transmitting portion 240. In this embodiment, the supporting portion 260 is pivoted to the second body 220 by a torsion spring 264. Therefore, after the engagement between the second engaging structure 262 and the first engaging structure 242 is released, the supporting portion 260 can automatically rotate along the second rotational axis R2 in a direction away from the second body 220 to a predetermined position, such that the foldable electronic apparatus 200 can be stably placed on a working platform after being unfolded. In specific, the supporting portion 260 rotating to a predetermined position can effectively compensate the moment generated by the first body 210 to the second body 220, so as to solve the problem that the foldable electronic apparatus 200 is easily overturned after being unfolded.

Definitely, the supporting portion 260 can also be pivoted to the second body 220 in another appropriate manner in addition to being pivoted to the second body 220 by the torsion spring 264. Moreover, in another embodiment, after the engagement between the second engaging structure 262 and the first engaging structure 242 is released, the supporting portion 260 can also be rotated to a predetermined position manually, such that the foldable electronic apparatus 200 can be stably placed on a working platform. The release of the engagement between the second engaging structure 262 and the first engaging structure 242 is illustrated in detail below.

Figure 4A:
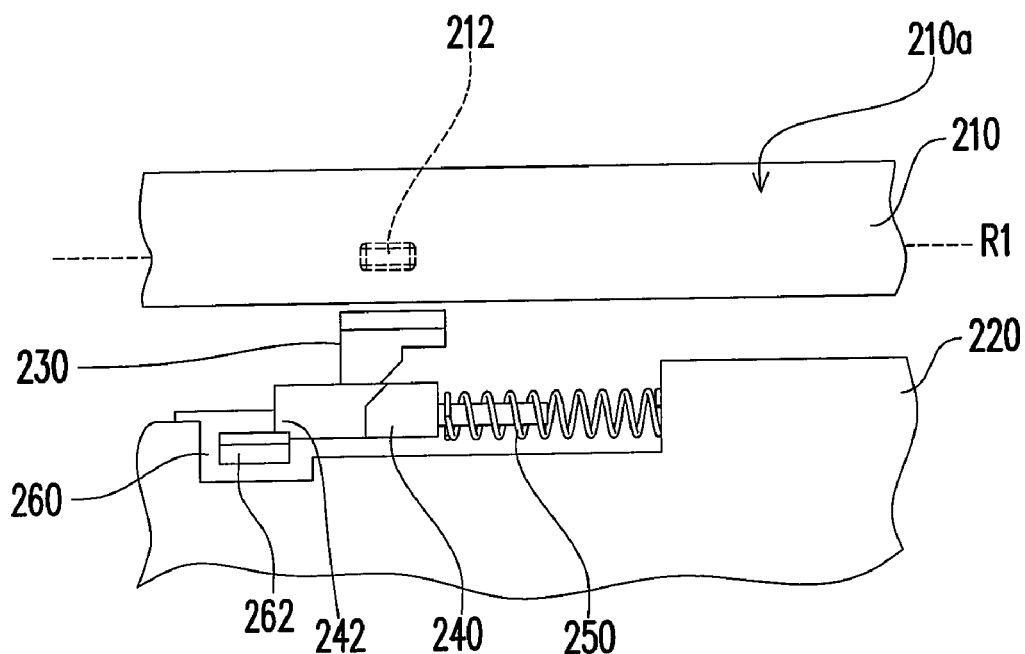
FIGS. 4A-4D are flow charts of the actuation between the protrusion, the first transmitting portion, the second transmitting portion, the bias component and the supporting portion when the first body rotates along the first rotational axis.

FIGS. 4A-4D are flow charts of the actuation between the protrusion, the first transmitting portion, the second transmitting portion, the bias component and the supporting portion when the first body rotates along the first rotational axis. In FIG. 4A, before the foldable electronic apparatus 200 is unfolded, the protrusion 212 disposed on the first body 210 is disposed away from the first transmitting portion 230 in the second body 220. Next, in FIG. 4B, when the user unfolds the foldable electronic apparatus 200 and rotates the first body 210 along the first rotational axis R1, the protrusion 212 rotates along the first rotational axis R1 and contacts the first transmitting portion 230.

Figure 4B:
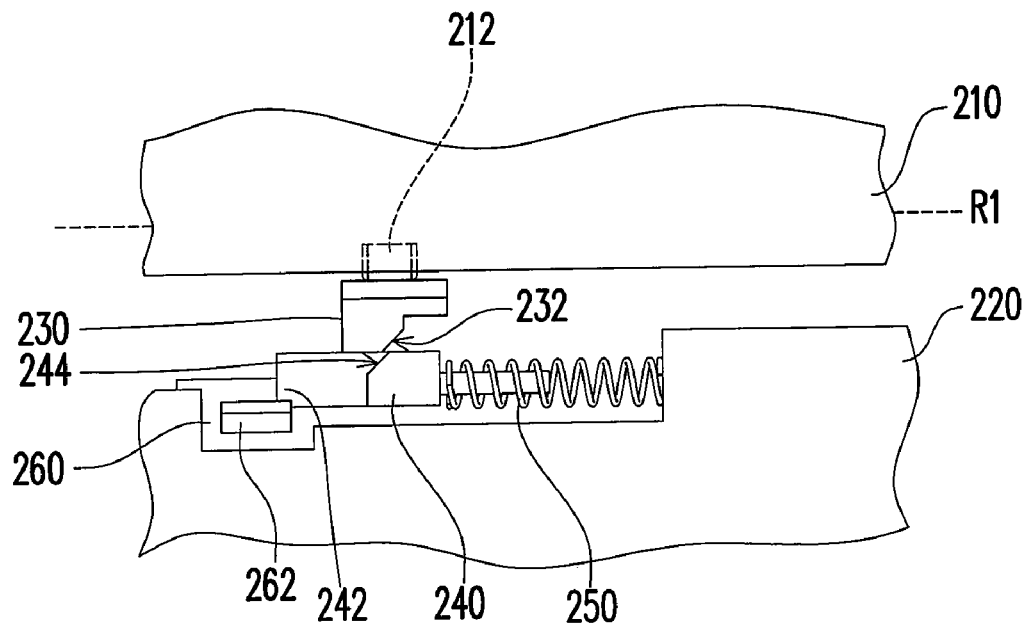
Figure 4C:
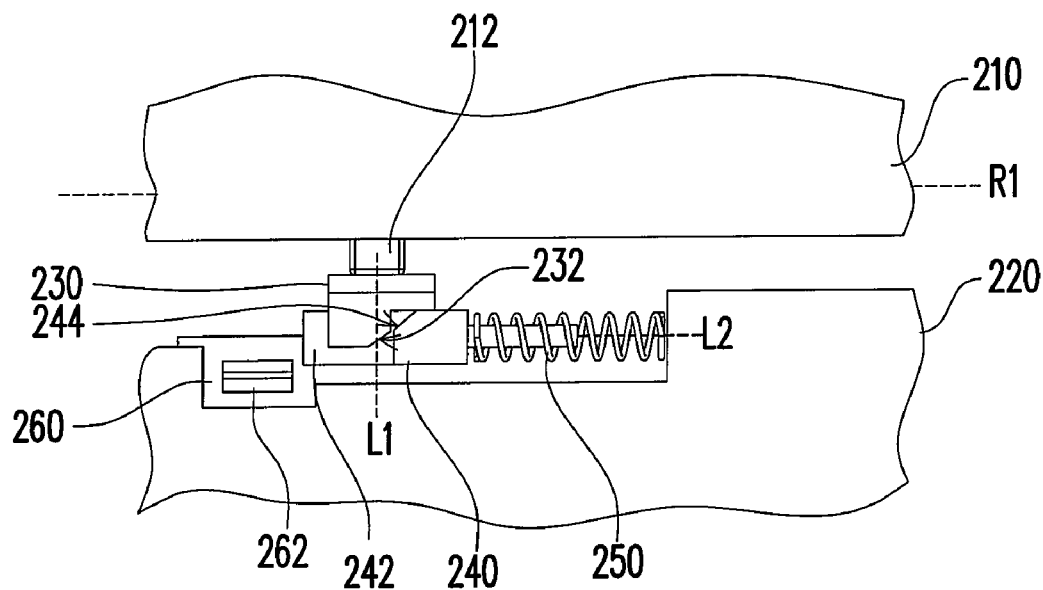
Figure 4D:
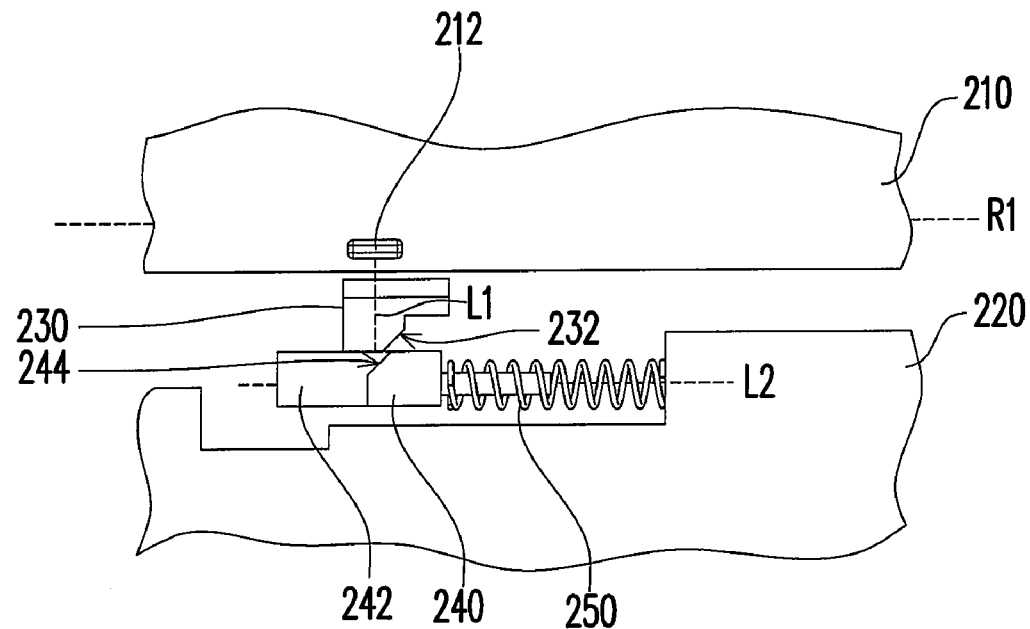

When the first body 210 continues rotating, the protrusion 212 applies a downward force to the first transmitting portion 230, so that the first transmitting portion 230 moves along the first axis L1 (as shown in FIG. 4C). When the first transmitting portion 230 moves along the first axis L1, the first transmitting portion 230 drives the second transmitting portion 240 to move along the second axis L2. Meanwhile, the engagement between the first engaging structure 242 of the second transmitting portion 240 and the second engaging structure 262 of the supporting portion 260 is released, such that the supporting portion 260 can rotate along the second rotational axis R2 to a predetermined position. After that, in FIG. 4D, when the first body 210 rotates to a position suitable for viewing (for example, an angle larger than 90° is formed between the first body 210 and the second body 220), the protrusion 212 rotating about the first rotational axis R1 is away from the first transmitting portion 230, and meanwhile the first transmitting portion 230 and the second transmitting portion 240 return to their original positions under the action of the bias component 250.

The actuation between the first transmitting portion 230 and the second transmitting portion 240 is further illustrated below. In this embodiment, the first transmitting portion 230 has a first inclined plane 232, and the second transmitting portion 240 has a second inclined plane 244 (as shown in FIG. 4B) corresponding to the inclined plane 232. When the first transmitting portion 230 moves along the first axis L1, the first inclined plane 232 may contact the second inclined plane 244 in the first axis L1. When the first transmitting portion 230 continues moving along the first axis L1, the first inclined plane 232 may push the second inclined plane 244, so as to make the second transmitting portion 240 move along the second axis L2 (as shown in FIG. 4C). At this time, the first engaging structure 242 disposed on the second transmitting portion 240 is driven to be departed from the second engaging structure 262 of the supporting portion 260, such that the engagement between the first engaging structure 242 and the second engaging structure 262 is released.

It should be noted that before the first transmitting portion 230 makes the second transmitting portion 240 move along the second axis L2, the second engaging structure 262 of the supporting portion 260 is engaged with the first engaging structure 242 on the second transmitting portion 240 (referring to FIG. 4B). When the protrusion 212 on the first body 210 rotates from the rotational position in FIG. 4B to the rotational position in FIG. 4C, the protrusion 212 may push the first transmitting portion 230 and make the first transmitting portion 230 and the second transmitting portion 240 move relatively (the first transmitting portion 230 may push the second transmitting portion 240 to move along the second axis L2). The relative movement between the first transmitting portion 230 and the second transmitting portion 240 may drive the first engaging structure 242 to be disengaged from the second engaging structure 262 (referring to FIG. 4C), such that the supporting portion 260 can rotate along the second rotational axis R2 in a direction away from the second body 220 to a predetermined position. As such, the foldable electronic apparatus 200 can use the supporting portion 260 to rotate to a predetermined position so as to effectively compensate the moment generated by the first body 210 to the second body 220, thereby solving the problem that the foldable electronic apparatus 200 is easily overturned after being unfolded. In other words, the foldable electronic apparatus 200 can be stably placed on a working platform after being unfolded.

In another aspect, after folding the foldable electronic apparatus 200, the user can push the supporting portion 260 to rotate toward the second body 220 and make the second engaging structure 262 and the first engaging structure 242 being engaged together, such that the supporting portion 260 can return to the original position thereof (as shown in FIG. 2A). Moreover, in a preferred embodiment, the second body 220 is provided with a plurality of connection ports 270. When the foldable electronic apparatus is folded, the supporting portion 260 covers the connection ports 270, so as to prevent the connection ports 270 from being contaminated by dust or being collided under the external force.

In view of the above, in the preferred embodiment of the present invention, at least one supporting portion is pivoted to the second body, such that after the foldable electronic apparatus is unfolded (the first body rotates relative to the second body to a position suitable for viewing), the supporting portion can rotate to a predetermined position through the actuation between the protrusion, the first transmitting portion and the second transmitting portion, and thus the supporting portion can compensate the moment generated by the first body to the second body. Compared with the conventional art, the supporting portion of the preferred embodiment of the present invention can solve the problem that the foldable electronic apparatus may be easily overturned. That is, the foldable electronic apparatus according to the preferred embodiment of the present invention can be stably placed on a working platform, such that the electronic components in the first body, for example, a display or in the second body may not be collided when the foldable electronic apparatus is overturned, thus avoiding influencing the normal operation of the electronic components in the display or the second body. In addition, at least one supporting portion pivoted to the second body will not increase the weight of the foldable electronic apparatus, i.e., the foldable electronic apparatus can still have the advantage of being light and thin.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A foldable electronic apparatus, comprising:
a first body, having at least one transmitting structure;
a second body, pivoted to the first body along a first rotational axis, wherein the transmitting structure on the first body is suitable to rotate along the first rotational axis;
at least one transmitting module, disposed in the second body, and corresponding to the transmitting structure; and
at least one supporting portion, wherein one side of the supporting portion is pivoted to the second body along a second rotational axis, and the other side thereof is connected to the transmitting module.

2. The foldable electronic apparatus as claimed in claim 1, wherein the transmitting structure is disposed on a surface of the first body adjacent to the second body.

3. The foldable electronic apparatus as claimed in claim 1, wherein the second body comprises at least one opening corresponding to the transmitting structure, the opening being disposed on a surface of the second body adjacent to the first body and exposing the transmitting module.

4. The foldable electronic apparatus as claimed in claim 1, wherein the supporting portion is pivoted to the second body by a torsion spring.

5. The foldable electronic apparatus as claimed in claim 1, wherein the transmitting module has a first engaging structure, the supporting portion has a second engaging structure, and the first engaging structure and the second engaging structure are engaged with each other.

6. The foldable electronic apparatus as claimed in claim 5, wherein the relative movement between the transmitting structure and the transmitting module drives the second engaging structure to be disengaged from the first engaging structure, and the supporting portion rotates along the second rotational axis in a direction away from the second body to a predetermined position.

7. The foldable electronic apparatus as claimed in claim 5, wherein the first engaging structure is a tenon, and the second engaging structure is a hook.

8. The foldable electronic apparatus as claimed in claim 1, wherein the second body comprises a plurality of connection ports covered by the supporting portion.

9. A foldable electronic apparatus, comprising:
a first body, having at least one protrusion;
a second body, pivoted to the first body along a first rotational axis, wherein the protrusion on the first body is suitable to rotate along the first rotational axis;
at least one first transmitting portion, disposed in the second body corresponding to the protrusion, wherein the protrusion rotating along the first rotational axis is suitable to drive the first transmitting portion to move along a first axis;
at least one second transmitting portion, disposed in the second body corresponding to the first transmitting portion, wherein the second transmitting portion has a first engaging structure;
at least one bias component, disposed between the second transmitting portion and the second body along a second axis, and applying a bias force to the second transmitting portion relative to the second body, wherein moving along the first axis, the first transmitting portion drives the second transmitting portion to move along the second axis to and fro; and
at least one supporting portion, pivoted to the second body along a second rotational axis, wherein the supporting portion has a second engaging structure, and the second engaging structure is used to engage the first engaging structure.

10. The foldable electronic apparatus as claimed in claim 9, wherein the protrusion is disposed on a surface of the first body adjacent to the second body.

11. The foldable electronic apparatus as claimed in claim 9, wherein the second body comprises at least one opening corresponding to the protrusion, the opening is disposed on a surface of the second body adjacent to the first body and exposes the first transmitting portion.

12. The foldable electronic apparatus as claimed in claim 9, wherein the supporting portion is pivoted to the second body by a torsion spring.

13. The foldable electronic apparatus as claimed in claim 9, wherein the relative movement between the first transmitting portion and the second transmitting portion drives the second engaging structure to be disengaged from the first engaging structure, and the supporting portion rotates along the second rotational axis in a direction away from the second body to a predetermined position.

14. The foldable electronic apparatus as claimed in claim 9, wherein the first engaging structure is a tenon, and the second engaging structure is a hook.

15. The foldable electronic apparatus as claimed in claim 9, wherein the second body comprises a plurality of connection ports covered by the supporting portion.

* * * * *